United States Patent
Choi (10) Patent No.: US 8,036,001 B2
(45) Date of Patent: Oct. 11, 2011

(54) RESONANT CONVERTER WITH VARIABLE FREQUENCY CONTROLLED BY PHASE COMPARISON

(75) Inventor: Hang-Seok Choi, Gyeonggi-do (KR)

(73) Assignee: Fairchild Korea Semiconductor Ltd., Hyungki-Do (KR)

( * ) Notice: Subject to any disclaimer, the term of this patent is extended or adjusted under 35 U.S.C. 154(b) by 421 days.

(21) Appl. No.: 12/417,168

(22) Filed: Apr. 2, 2009

(65) Prior Publication Data
US 2009/0251929 A1    Oct. 8, 2009

(30) Foreign Application Priority Data
Apr. 2, 2008    (KR) .................. 10-2008-0030925

(51) Int. Cl.
H02M 3/335    (2006.01)

(52) U.S. Cl. ...................... 363/21.02; 363/97
(58) Field of Classification Search ............... 363/21.02, 363/97
See application file for complete search history.

(56) References Cited

U.S. PATENT DOCUMENTS

| | | | | |
|---|---|---|---|---|
| 4,794,506 | A * | 12/1988 | Hino et al. | 363/25 |
| 4,939,402 | A * | 7/1990 | Hirayama et al. | 310/316.01 |
| 6,087,782 | A | 7/2000 | Majid et al. | |
| 6,166,922 | A * | 12/2000 | Kobori et al. | 363/17 |
| 7,218,533 | B2 * | 5/2007 | Radecker et al. | 363/21.02 |
| 7,382,636 | B2 * | 6/2008 | Baarman et al. | 363/97 |
| 2009/0251929 | A1* | 10/2009 | Choi | 363/21.02 |

* cited by examiner

Primary Examiner — Jeffrey Sterrett
(74) Attorney, Agent, or Firm — Alston & Bird LLP (57) ABSTRACT

A converter and a driving method thereof are provided. The converter includes first and second switches, and generates a square wave signal according to operations of the first and second switches. The converter includes a first capacitor and a primary coil, and resonates a driving voltage by using a driving voltage with the first capacitor and the primary coil so as to generate a driving current. The converter includes a secondary coil that forms the primary coil and the transformer, and generates output power by rectifying a current and a voltage generated in the secondary coil. In addition, the converter detects the phase of the driving current, and increases switching frequencies of the first and second switches if a phase difference of the phase of the driving current and that of the driving voltage is smaller than a predetermined value.

22 Claims, 7 Drawing Sheets

RESONANT CONVERTER WITH VARIABLE FREQUENCY CONTROLLED BY PHASE COMPARISON

CROSS-REFERENCE TO RELATED APPLICATION

This application claims priority to and the benefit of Korean Patent Application No. 10-2008-0030925 filed in the Korean Intellectual Property Office on Apr. 2, 2008, the entire contents of which are incorporated herein by reference.

BACKGROUND OF THE INVENTION (a) Field of the Invention

The present invention relates to a resonant converter, and more particularly, it relates to a converter that performs a zero voltage switching operation and a driving method thereof.

(b) Description of the Related Art

A driving voltage and a driving current are input to a resonance network of a resonant converter. The driving voltage and the driving current are defined as a voltage and a current that are input to the resonance network of the resonant converter. The driving current is preferred to have a waveform with a phase that is slow compared to that of the driving voltage. As a switch that controls operation of the converter, a transistor element is typically used. When the transistor is being turned on, the overlap area of transistor current and voltage makes switching loss. Thus, when the transistor is being turned on, it is preferred that a voltage difference between drain and source electrodes is small in order to minimize a switching loss. When the driving current has a lagging phase compared to the driving voltage, a current flowing through a body diode of the transistor while the transistor is being turned on is generated. Then, a voltage difference between the drain and source electrodes of the transistor during turn-on transition is reduced, thereby reducing the switching loss.

An inductive region and a capacitive region can be divided in accordance with an impedance characteristic of the resonant network of resonant converter. If a switching frequency is faster than a resonant frequency of the resonant network, the resonant converter operates in the inductive region. If the resonant frequency is faster than the switching frequency, the resonant converter operates in the capacitive region. This is according to frequency dependent characteristics of the impedance of resonant network. When the network has inductive impedance, the impedance increases in proportion to frequency while the impedance changes inversely proportional to the frequency when the network has capacitive impedance. While the resonant converter operates in the inductive region, the driving current has a lagging phase compared to the driving voltage. Because the operation in the inductive region minimizes switching loss, the resonant converter is always designed to operate in inductive region. When the resonant converter operates in inductive region, the input power increases as switching frequency decreases since the input impedance decreases as the frequency decreases.

A switching frequency of the converter may vary according to a load connected to an output end of the resonant converter. When the output load increases, the controller decreases the switching frequency so as to decrease the input impedance and therefore to increase input power. In further detail, when the converter is overloaded, the switching frequency is decreased in order to obtain the maximum gain. When the switching frequency is decreased to be smaller than the resonance frequency, the converter operates in the capacitive region. When the resonant converter operates in the capacitive region, a reverse recovery current is generated due to a body diode of the transistor that is a switching element in the switching operation. When a backward voltage is applied while a current is flowing forward to the diode, the current gradually becomes zero after the current flows backward rather than immediately becoming zero. This current is referred to a reverse recovery current. Due to this current, serious switching noise and switching loss are generated. In addition, the resonant converter may operate in the capacitive region in the case in which an output end is short circuited.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a converter that stably operates in an inductive region, and a driving method thereof.

An exemplary converter according to an embodiment of the present invention includes a square wave generator, a resonant network unit, a rectifier network unit, and a switch controller. The square wave generator has first and second switches, and generates a square wave signal according to operations of the first and second switches. The resonant network unit has a first capacitor and a primary coil of a transformer, and resonates a driving voltage by using the first capacitor and the primary coil of a transformer so as to generate a driving current. The rectifier network unit has a secondary coil that is magnetically coupled to the primary coil of the transformer, and generates output voltage by rectifying a current and a voltage generated in the secondary coil. The switch controller detects the phase of the driving current, and increases switching frequencies of the first and second switches when a phase difference between the phase of the driving current and that of the driving voltage is smaller than a predetermined value. A current that is the same as the driving current flows through the first switch during a turn-on state, and the switch controller measures a current flowing through the first switch just before the first switch is turned off, and detects the phase difference between the phase of the driving current and that of the driving voltage. The switch controller generates a triangle wave signal having a cycle that is the same as that of the switching frequency of the first switch, turns off the first switch if a voltage of the triangle wave signal reaches a predetermined first reference voltage, and detects the phase of the driving current by measuring the current flowing through the first switch when the voltage of the triangle wave signal reaches a second reference voltage. Here, the second reference voltage is slightly lower than the first reference voltage. The switch controller increases a slope of the triangle wave signal if the current measured just before the first switch is turned off is smaller than the first reference value, and the first reference value is greater than zero. The switch controller includes a switch that is turned on when the current that is measured just before the first switch is turned off is smaller than the first reference value, and the slope of the triangle wave signal is increased in accordance with a current flowing through the turned-on switch. The converter according to the embodiment of the present invention further includes a capacitor having a first end connected to a first end of the switch and a second end that is grounded, and a first transistor having a first end connected to the first end of the switch and the first end of the capacitor and a second end that is maintained at a predetermined voltage. When the switch is turned on, the capacitor is discharged so that a voltage of the first end of the first resistor is reduced. The converter further includes a first switch having a first end connected to the second switch and a second end that is grounded through a second resistor, and the switch controller includes: a first comparator that compares a voltage across the second resistor with a first threshold voltage that corresponds to the first reference value; a second comparator that compares the triangle wave signal with the second reference voltage; a first logical operator that generates a first sampling signal corresponding to an output signal of the second comparator; a second logical operator that receives the first sampling signal and generates a second sampling signal corresponding to an output signal of the first comparator; and an SR flipflop having a set end to which the second sampling signal is input, and an output signal of the SR flipflop controls turn-on/off of the switch. A first threshold voltage is input to a non-inversion terminal of the first comparator, a voltage of the lateral ends of the second resistor is input to an inversion terminal of the first comparator, a second threshold voltage is input to a non-inversion terminal of the second comparator, the voltage across the second voltage is input to an inversion terminal of the second comparator, the triangle wave signal is input to a non-inversion terminal of the third comparator, the second reference voltage is input to an inversion terminal of the third comparator, and the first to third logical operators perform an AND operation. The switch controller turns off the turned-on switch if the current measured just before the first switch is turned off is greater than a second reference value, and the second reference value is greater than the first reference value.

In addition, the converter further includes a second resistor having a first end connected to the first end of the first switch, and a second end that is grounded, and the switch controller includes a first comparator, a second comparator, a third comparator, a first logical operator, a second logical operator, a third logical operator, and an SR flipflop. The first comparator compares voltages at lateral ends of the second resistor with a first threshold voltage that corresponds to the first reference value. The second comparator compares voltages of lateral ends of the second resistor with a second threshold voltage that corresponds to the second reference value. The third comparator compares the triangle wave signal with the second reference voltage. The first logical operator generates a first sampling signal corresponding to an output signal of the third comparator. The second logical operator receives the first sampling signal and generates a second sampling signal corresponding to an output signal of the first comparator. The third logical operator receives the first sampling signal and generates a third sampling signal corresponding to an output signal of the second comparator. The SR flipflop has a set end to which the second sampling signal is input and a reset end to which the third sampling signal is input, and controls turn-on/off of the switch by using an output signal thereof. A first threshold voltage is input to a non-inversion terminal of the first comparator, a voltage of the lateral ends of the second resistor is input to an inversion terminal of the first comparator, a second threshold voltage is input to a non-inversion terminal of the second comparator, the voltage of the lateral ends of the second voltage is input to an inversion terminal of the second comparator, the triangle wave signal is input to a non-inversion terminal of the third comparator, the second reference voltage is input to an inversion terminal of the third comparator, and the first to third logical operators perform an AND operation.

The switch controller of the converter according to the embodiment of the present invention further includes a protection unit that counts the number of times that a current flowing through the first switch just before the first switch is turned off is smaller than the first reference value, and allows no more switching operation of the first and second switches if the counted number of times reaches to a predetermined number of times. The switch controller turns off the turned-on switch if the current that is measured just before the first switch is turned off is greater than a second reference value, and the second reference value is greater than the first reference value. The protection unit resets the counted number of times if the current flowing through the first switch just before the first switch is turned off is greater than the second reference value before the counted number of times reaches the predetermined number of times. In the converter according to the embodiment of the present invention, the first capacitor and the primary coil are connected in series, a voltage signal of lateral ends of the serially connected first capacitor and the primary coil is the driving voltage, and a current flowing to the first capacitor and the primary coil is the driving current.

A driving method of a converter according to another embodiment of the present invention includes: generating a driving voltage according to switching operations of first and second switches; generating a driving current according to a resonance generated in a capacitor and a primary coil that are serially connected between lateral ends of the second switch; detecting the driving current just before the first switch is turned off; comparing the detected current with a first reference value that is greater than zero, and increasing switching frequencies of the first and second switches if the detected current is smaller than the first reference value; and stopping the increase of the switching frequencies of the first and second switches if the detected current is greater than a second reference value that is greater than the first reference value. The increasing of the switching frequency of each of the first and second switches includes: generating a triangle wave having a cycle that is the same as that of a switching operation of each of the first and second switches; increasing a slope of the triangle wave if the detected driving current is greater than the first reference value; and turning off the first switch if the triangle wave reaches the maximum value. The generating of the triangle wave includes charging a first capacitor with a first current source, and discharging the first capacitor with a second current source. Here, the triangle wave is a voltage signal of the capacitor. The increasing of the slope of the triangle wave includes discharging charges charged in a second capacitor having a first end and a second end that is grounded, the first end connected to a second end of a resistor having a first end to which a predetermined voltage is applied, and the first and second current sources are increased or decreased corresponding to a current flowing to the resistor. The driving method of the converter according to another embodiment of the present invention includes counting the number of times that the detected driving current is smaller than the first reference value, and allowing no more switching operation of the first and second switches if the counted number of times reaches a predetermined number of times. The counted number of times is reset if the detected driving current is greater than the second reference value before the counted number of times reaches the predetermined number of times.

As described above, the converter and the driving method thereof according to the present invention can change a switching frequency by detecting a phase difference between a driving current and a driving voltage.

In addition, the present invention provides a converter that can stably operate in an inductive region by changing a switching frequency, and a driving method thereof.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

A converter according to an exemplary embodiment of the present invention will be described in further detail with reference to the drawings. Hereinafter, switching operation implies that a switch is turned on and maintained in the turn-on state for a predetermined time period after being turned on, and turned off and maintained in the turn-off state until it is turned on again.

Figure 1:
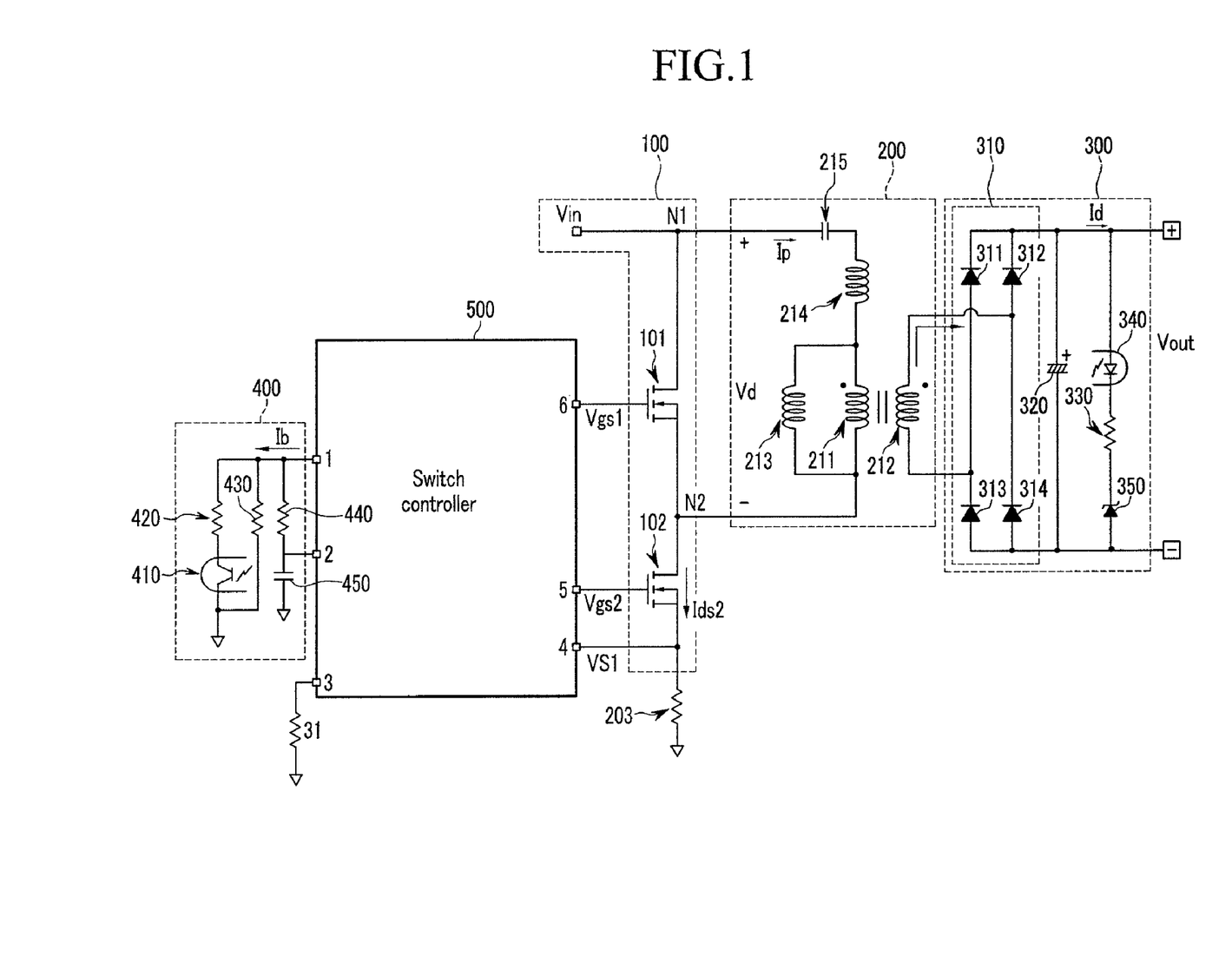
FIG. 1 shows a configuration of a converter according to an exemplary embodiment of the present invention.

FIG. 1 shows a configuration of the converter according to the exemplary embodiment of the present invention.

As shown in FIG. 1, the resonant converter according to the exemplary embodiment of the present invention includes a square wave generator 100, a resonant network unit 200, a rectifier network unit 300, a feedback data generator 400, and a switch controller 500.

The square wave generator 100 includes an upper-side switch 101 and a lower-side switch 102. The square wave generator 100 generates an input direct current (DC) voltage Vin by switching operation of the upper-side switch 101 and the lower-side switch 102. In further detail, the upper-side switch 101 and the lower-side switch 102 are alternately turned on/off. Then, a driving voltage Vd between a node N1 and a node N2 has a voltage of the same level as the voltage Vin as a peak value and 0V voltage as the lowest value. A voltage drop amount due to a resistor 203 is small enough to be ignored, and a peak value of the driving voltage Vd is substantially the same as the voltage Vin. The upper-side switch 101 is controlled by the gate control signal Vgs1 transmitted from the switch controller 500, and the lower-side switch 102 is controlled by a gate control signal Vgs2. According to the exemplary embodiment of the present invention, the upper-side switch 101 and the lower-side switch 102 are each realized as an n-channel type metal oxide semiconductor field-effect transistor (MOSFET).

The resonant network unit 200 includes a primary coil 211, a secondary coil 212, and a capacitor 215. FIG. 1 equivalently illustrates inductors 213 and 214 by reflecting a leakage inductance component of a transformer formed by the primary coil 211 and the secondary coil 212, and a magnetizing inductance component. In further detail, the magnetizing inductor 213 corresponds to the magnetizing inductance component and the leakage inductor 214 corresponds to the leakage inductance component. In the resonant converter according to the exemplary embodiment of the present invention, a resonance is generated between the magnetizing inductor 213, the leakage inductor 214, and the capacitor 215. A driving current Ip input to the resonant network unit 200 due to the resonance has sinusoidal waves. The driving current Ip according to the exemplary embodiment of the present invention is controlled to have a lagging phase compared to the phase of the driving voltage Vd. Voltages at lateral ends of the primary coil 211 are changed in accordance with a winding ratio of the primary coil 211 and the secondary coil 212, and a voltage is induced to the secondary coil 212. The current Ip is changed in accordance with the winding ratio of the primary coil 21 and the secondary coil 212 so that a current Is is generated in the secondary coil 212. A waveform of the current Ip is a sum of a current generated in the primary coil 211 that is influenced by the current Is and a magnetizing component current that is generated by the magnetizing inductance.

The rectifier network unit 300 includes a bridge rectifier circuit 310 and a capacitor 320, and generates output power. The bridge rectifier circuit 310 includes four diodes 311 to 314, and generates a current Id by rectifying the current Is. When the current Id flows, the capacitor 320 is charged by the current Id. When the current Id does not flow, the capacitor 320 supplies a current for a load by discharging charged charges. Voltages at lateral ends of the capacitor 320 become an output voltage Vout. A zener diode 350 maintains the output voltage Vout at a constant level by preventing the output voltage Vout from being changed by the load or the input voltage Vin. A voltage detection diode 340 emits light in proportion to voltages applied to lateral ends thereof. The output voltage Vout is distributed to the voltage detection diode 340, the zener diode 350, and a resistor 330. Accordingly, as the output voltage Vout increases, a voltage applied to the voltage detection diode 340 increases, and light emission increases. The voltage detection diode 340 and a detection transistor 410 of the feedback data generator 300 form an opto-coupler.

The feedback data generator 400 generates load data and transmits the load data to a connection terminal 1 of the switch controller 400. A synch-type current is transmitted to the switch controller 500 through the connection terminal 1. A voltage of the connection terminal 1 is maintained at a constant level by the switch controller 500. When the load increases, the current Id supplied to the load increases and output power of the resonant converter is maintained at a constant level, and accordingly, the output voltage Vout is reduced. When the load decreases, the output voltage Vout increases.

Since the output voltage Vout is changed in accordance with a load connected to an output end and a current that is proportional to the output voltage Vout is generated by the detection transistor 410, a current that is synchronized through the connection terminal 1 is increased. In addition, when the load increases, the feedback data generator 400 discharges charges charged in a capacitor 450 to a connection terminal 2 so that the amount of current synchronized through the connection terminal 1 is increased.

In further detail, the feedback data generator 400 includes the detection transistor 410, resistors 420, 430, and 440, and the capacitor 450. When the output voltage Vout is increased so that light emission of the voltage detection diode 340 is increased, the amount of current flowing to the detection transistor 410 is increased, thereby increasing the current Ib flowing to the feedback data generator 400 from the connection terminal 1. In addition, a discharge path of the capacitor 450 according to the exemplary embodiment of the present invention includes a resistor 31 connected to a connection terminal 3.

The switch controller 500 has a switch that connects the connection terminals 2 and 3, and a voltage of a node N4 is reduced when the charges charged in the switch controller 500 are discharged. Since a voltage of the connection terminal 1 is maintained at a constant level and the voltage of the node N4 is reduced, the amount of current flowing to the resistor 440 is decreased. Then, the amount of current Ib synchronized through the connection terminal 1 is increased. In other words, when the converter is overloaded, a switching frequency is decreased so as to compensate the decreasing current Ib for preventing the converter from being operated in a capacitive region. This will be described in further detail later with reference to FIG. 6 and FIG. 7.

Figure 2:
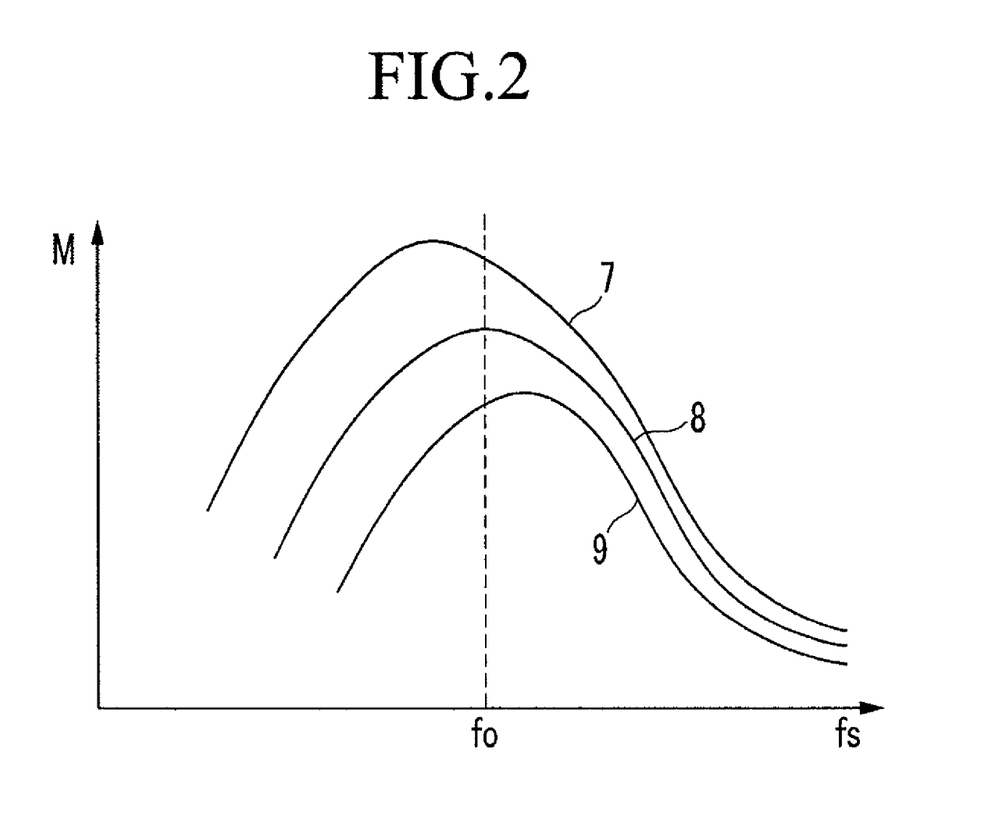
FIG. 2 shows a correlation between a switching frequency fs and a gain M according to a load of a resonant converter.

FIG. 2 shows a correlation of a switching frequency fs and a gain M according to the load of the resonant converter.

Figure 3A:
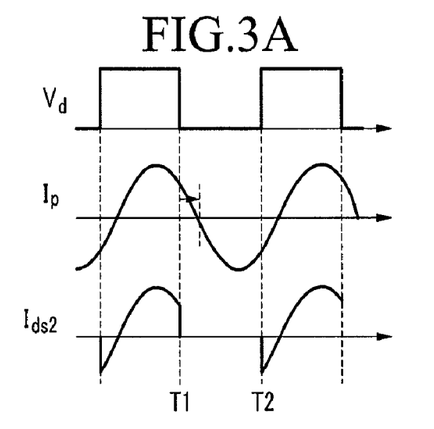
FIGS. 3A-3C respectively show a driving voltage Vd, a driving current Ip, and a lower-side switch current ids2 that respectively correspond to three curves that show correlations between the switching frequency fs and the gain M.
Figure 3B:
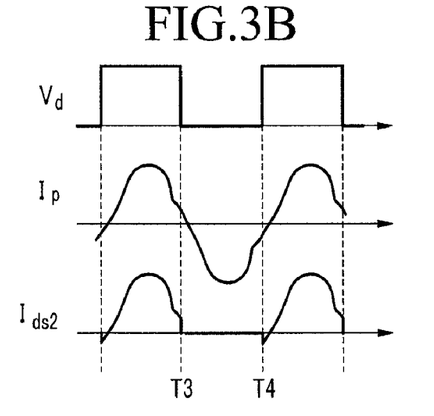
Figure 3C:
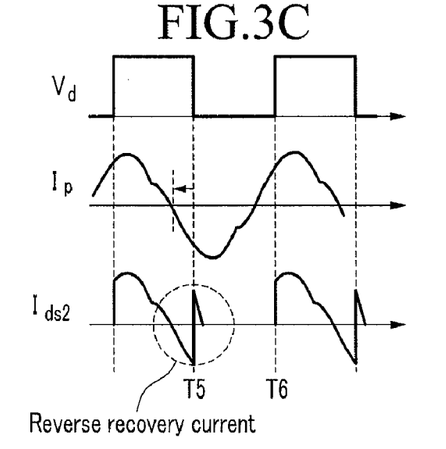

FIG. 3A-3C respectively show a driving voltage Vd, a driving current Ip, and a lower-side switch current ids2 that respectively correspond to three curves that show correlations between the switching frequency fs and the gain M. The lower-side switch current Ids2 is the same as the driving current Ip for a period during which the lower-side switch 102 is in the turn-on state, and it does not flow for a period during which the lower-side switch 102 is turned off.

Figure 4:
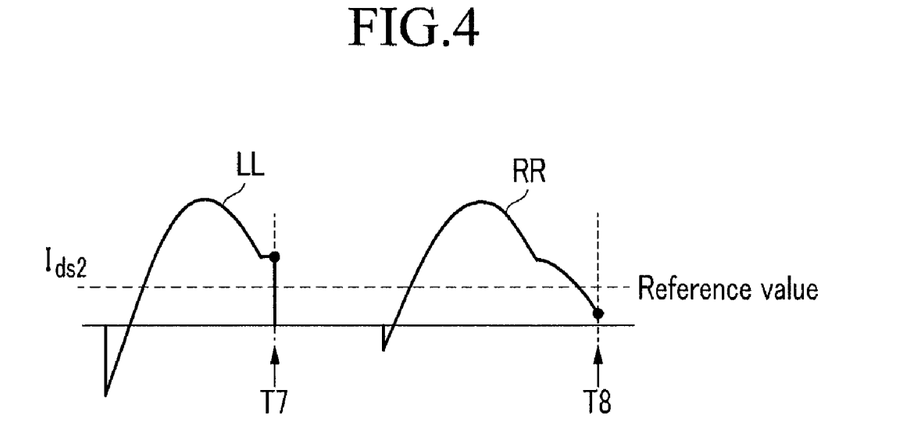
FIG. 4 shows waveform variation of the lower-side switch current ids2 as a load at an output end of the resonant converter increases according to the exemplary embodiment of the present invention.

FIG. 4 shows waveform variation of the lower-side switch current ids2 as a load at an output end of the resonant converter increases according to the exemplary embodiment of the present invention.

Operation of the resonant converter according to the exemplary embodiment of the present invention will now be schematically described with reference to FIGS. 2 to 4.

As shown in FIG. 2, when the resonant converter is not overloaded so that it operates in an inductive region, the switching frequency fs and the gain M have a correlation like a curve 7. The gain corresponds to a ratio of the input voltage Vin and the output voltage Vout. As the load of the resonant converter increases, a correlation curve of the switching frequency and the gain moves in parallel to a right-lower side. A curve 8 shows a case in which the driving current Ip and the driving voltage Vd are close to in-phase as the load of the converter increases. A curved line 9 shows a case in which the driving current Ip has a leading phase compared to the driving voltage Vd when the converter is overloaded. In FIG. 2, a dotted vertical line indicates a resonance frequency fo, and M indicates a gain of a current converter. The resonant converter outputs constant output power without regard to input power.

FIG. 3A shows a driving voltage Vd, a driving current Ip, and a lower-side switch current Ids2 that respectively correspond to the curve 7. As shown in FIG. 3A, the driving current Ip has a lagging phase compared to the driving voltage Vd. In this instance, since the driving current Ip is greater than zero (0) at a time point T1 at which the upper-side switch 101 is turned on and the lower-side switch 102 is turned off, a reverse recovery current is not generated. In other words, at the time point T1, the lower-side switch 102 is an n-channel transistor and no current flows through a body diode of the transistor so that the reverse recovery current is not generated. When the lower-side switch 102 is turned on at a time period T2, a current flows through a body diode of the lower-side switch 102 so that a voltage difference between a drain electrode and a source electrode is reduced. Accordingly, a switching loss is reduced.

FIG. 3B shows a driving voltage Vd, a driving current Ip, and a lower-side switch current Ids2 that respectively correspond to the curve 8. As shown in FIG. 3B, the phase of the driving current Ip is closer to the in-phase than that of the driving voltage Vd, but the phase of the driving voltage Vd lags slightly more than that of the driving current Ip. As in FIG. 3A, the driving current Ip is greater than zero at a time period T3, and therefore, a reverse recovery current is not generated. In addition, since a small current flows through a body diode of the lower-side switch 102 at a time period T4, a switch loss of the curve 8 is greater than that of the curve 7. In addition, the reverse recovery current can very possibly be generated when the curve 8 moves due to load variation. Therefore, it is not desirable for the resonant converter to operate in accordance with the curve 8.

FIG. 3C shows a driving voltage Vd, a driving current Ip, and a lower-side switch current Ids2 that respectively correspond to a curve 9. As shown in FIG. 3C, the driving current Ip has a leading phase compared to the driving voltage Vd. In this instance, since the driving current Ip is smaller than zero at a time point T5 at which the upper-side switch 101 is turned on and the lower-side switch 102 is turned off, a reverse recovery current is generated. In further detail, at a time period T5, when the lower-side switch 102 is turned off while a forward current flows through the body diode of the lower-side switch 102, a reverse direction voltage is applied to the body diode due to a voltage difference between drain and source electrodes of the lower-side switch 102. Accordingly, a reverse recovery current is generated. In addition, when the lower-side switch 102 is turned on at a time period T6, no current flows through the body diode of the lower-side switch 102 so that the drain and source electrodes of the lower-side switch 102 have a large voltage difference Accordingly, the switching loss increases.

When the load increases, the phase of the driving current Ip starts to approach the phase of the driving voltage Vd so that the phase of the driving current Ip becomes faster than that of the driving voltage Vd in the overloaded state as described above. When the driving current Ip has the lagging phase, the leading phase of the driving current Ip should be slowed down by increasing the impedance component of the resonance network unit 200.

As shown in FIG. 4, the resonant converter according to the exemplary embodiment of the present invention detects the current Ids2 that flows when the lower-side switch 102 is turned off so as to detect the phase of the driving current Ip. While the lower-side switch 102 is in the turn-on state, the current Ids2 and the driving current Ip have the same wave-forms, and therefore the switch controller 500 can detect the phase of the driving current Ip by using the current Ids2. The lower-side switch 102 is turned off when the driving voltage Vd becomes zero, and the phase of the driving current Ip is slower than that of the driving voltage Vd when the driving current Ip is greater than zero. Therefore, a reference value may be set to zero, but this is not desirable since the phase of the driving current Ip may lead the phase of the driving voltage Vd due to a small change of the load. Therefore, the reference value of the resonant converter according to the exemplary embodiment of the present invention can be set to a value that is greater than zero. A more accurate reference value can be set to a proper value according to a resonant converter.

In FIG. 4, a waveform LL of the current Ids2 is greater than the reference value at a time period T7 at which the lower-side switch 102 is turned off, and therefore the phase of the driving current Ip is slower than that of the driving voltage Vd. However, a waveform RR of the current Ids2 is less than the reference value at a time period T8 at which the lower-side switch 102 is turned off. In the case of the waveform RR, the phase of the driving current Ip is slower than that of the driving voltage Vd at present, but it may be faster in accordance with a change of the load. Therefore, the resonant converter according to the exemplary embodiment of the present invention increases the switching frequency when the current Ids2 in FIG. 4 is detected.

Figure 5:
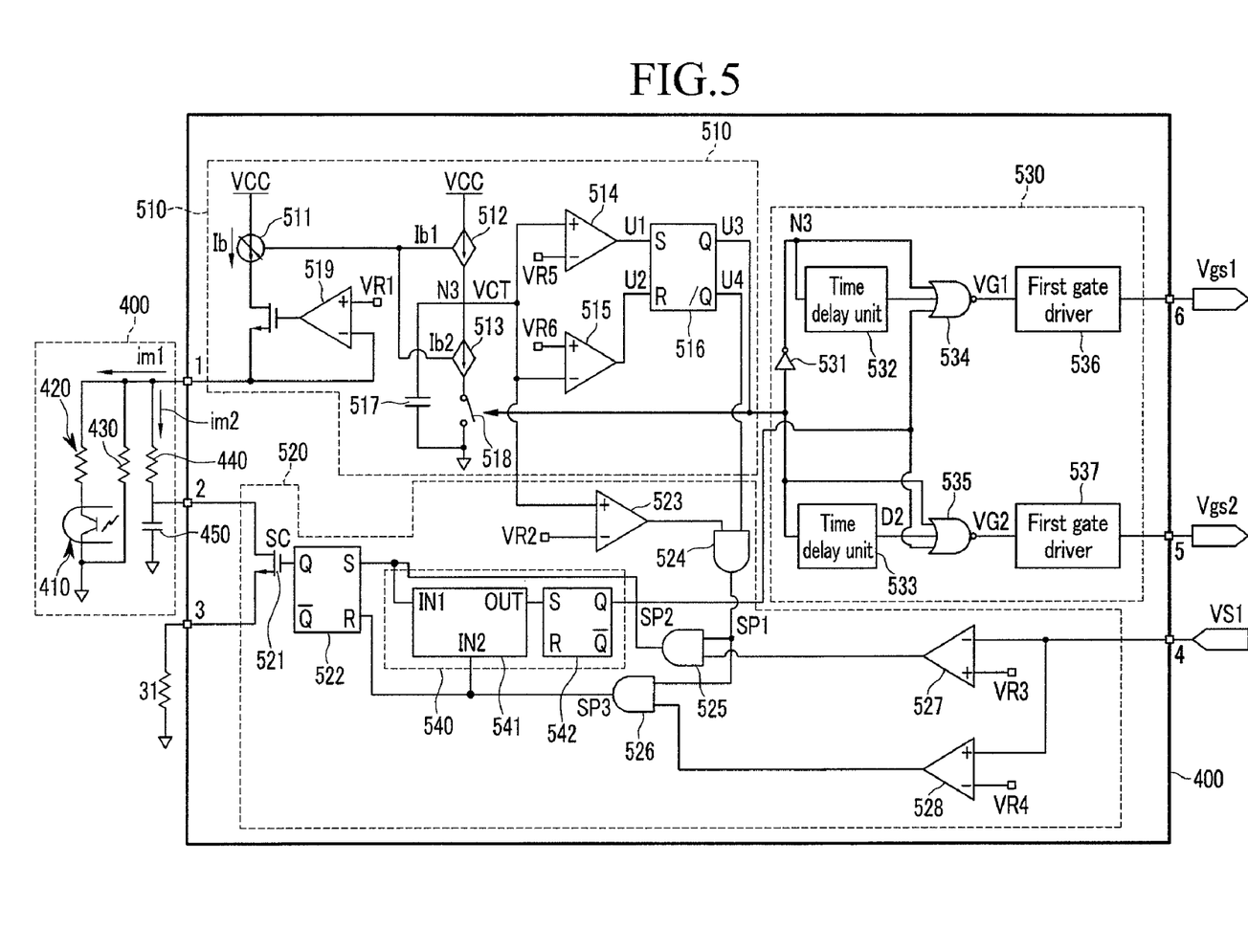
FIG. 5 shows a switch controller 500 according to the exemplary embodiment of the present invention.

Referring to FIG. 5, the switch controller according to the exemplary embodiment of the present invention will now be described in further detail.

FIG. 5 shows the switch controller 500 according to the exemplary embodiment of the present invention. As shown in FIG. 5, the switch controller 500 outputs gate control signals Vgs1 and Vgs2 to the upper-side switch 101 and the lower-side switch 102 through a connection terminal 6 and a connection terminal 5, respectively. The switch controller 500 receives a signal VS1 that corresponds to the current Ids2 and feedback data respectively through a connection terminal 4 and the connection terminal 1.

As shown in FIG. 5, the switch controller 500 includes an oscillator 510, a current detection unit 520, a pulse frequency modulation (PFM) controller 530, and a protection unit 540.

The oscillator 510 receives feedback data from the feedback data generator 400 through the connection terminal 1, and generates a signal VCT having a period that is determined in accordance with the feedback data. The oscillator 510 generates first and second oscillator signals U3 and U4 by using the signal VCT. The first oscillator signal U3 controls switching operation of the upper-side switch 101 and the lower-side switch 102, and the second oscillator signal U4 and the signal VCT are used for controlling the feedback data generator 400.

In further detail, the oscillator 510 includes a variable current source 511, a first dependant current source 512, a second dependant current source 513, a first comparator 514, a second comparator 515, an SR flipflop 516, a capacitor 517, a switch 518, and a third comparator 519. The variable current source 511, the first dependant current source 512, the second dependant current source 513, the capacitor 517, the switch 518, and the third comparator 519 are configured to generate the signal VCT of which the period is determined by the feedback data. The third comparator 519 outputs a voltage signal according to a voltage difference between a reference voltage VR1 that is input to a non-inversion terminal (+) and a voltage of the connection terminal 1 that is input to an inversion terminal (−).

When the voltage of the connection terminal 1 is reduced to be lower than the reference voltage VR1, a voltage difference is generated between the reference voltage 1 and the connection terminal 1 so that the output voltage of the third comparator 519 is increased. Then, impedance of the transistor 518 is decreased so that a current flowing through the transistor 518 is increased. When the current flowing through the transistor 518 is increased, the voltage of the connection terminal 1 is increased to be equal to the reference voltage VR1. That is, the transistor 518 functions like a variable resistor, and the voltage of the connection terminal 1 is constantly maintained at the reference voltage VR1. The first comparator 514, the second comparator 515, and the SR flipflop 516 are configured to generate the first and second oscillator signals U3 and U4 by using the signal VCT.

In further detail, the variable current source 511 generates a current Ib, and the current Ib is determined by a current im1 that varies in accordance with a current flowing to the detection transistor 410 and a current im2 flowing to the resistor 440. Here, the current flowing to the detection transistor 410 is determined by the output voltage Vout.

The first dependant current source 512 generates a first dependent current Ib1 according to the current Ib. The second dependant current source 513 generates a second dependant current Ib2 according to the current Ib. The first and second dependent current sources 512 and 513 generate the first and second dependant currents Ib1 and Ib2 that vary with the current Ib by using a current mirror circuit. The second dependant current Ib2 is greater than the first dependant current Ib1. A first end of the capacitor 517 is connected to a node N3 that is electrically connected to the first dependant current source 512 and the second dependant current source 513, and a second end of the capacitor 517 is grounded. The switch 518 is electrically connected between the second dependant current source 513 and a ground. The switch 518 operates in accordance with the first oscillator signal U3.

In further detail, the switch 518 is turned on when the first oscillator signal U3 is high, and is turned off when the first oscillator signal U3 is low. While the switch 518 is in the turn-off state, the first dependent current Ib increases a voltage of the signal VCT by charging the capacitor 517, and the second dependent current Ib2 discharges the capacitor 517 to reduce the voltage of the signal VCT when the switch 518 is turned on. The signal VCT is input to a non-inversion terminal (+) of the first comparator 514 and is input to an inversion terminal (−) of the second comparator 515. The first comparator 514 compares a reference voltage VR5 and the voltage of the signal VCT, and outputs a high-level signal U1 when the voltage of the signal VCT is higher than the reference voltage VR5 and outputs a low-level signal U1 when the voltage of the signal VCT is lower than the reference voltage VR5. The second comparator 515 compares a reference voltage VR6 and the voltage of the signal, and outputs a high-level signal U2 when the voltage of the signal VCT is lower than the reference voltage VR6 and outputs a low-level signal U2 when the voltage of the signal VCT is higher than the reference voltage VR6.

In this instance, the reference voltage VR5 is higher than the reference voltage VR6 in the present exemplary embodiment. The SR flipflop 516 receives the signal U1 and the signal U2 respectively through a set end S and a reset end R, and generates the first and second oscillator signals U3 and U4 according to levels of the signal U1 and the signal U2. Hereinafter, levels of signals input to the set end S and the reset end R of the SR flipflop 616 will be classified as "SR=00", "SR=10", and "SR=01" for ease of description. "SR=00" indicates that the signal U1 and the signal U2 are in the low-level state. "SR=10" indicates that the signal U1 is high and the signal U2 is low. "SR=01" indicates that the signal U1 is low and the signal U2 is high.

The SR flipflop 516 according to the exemplary embodiment of the present invention maintains a current output state when SR=00, and outputs a high-level signal through an output end Q and outputs a low-level signal through an inversion output end /Q when SR=10. In addition, when SR=01, the SR flipflop 516 outputs a low-level signal through the output end Q and outputs a high-level signal through the inversion output end /Q. When the voltage of the signal VCT is increased to the reference voltage VR5, the signal U1 becomes a high-level signal and the signal U2 becomes a low-level signal.

Accordingly, the first oscillator signal U3 output through the output end Q of the SR flipflop 516 becomes a high-level signal and the switch 518 is turned on so that the charges charged in the capacitor 517 are discharged. Then, the voltage of the signal VCT is reduced. Since the voltage of the signal VCT becomes lower than the reference voltage VR5, the signal U1 becomes a low-level signal and the signal U2 is a low-level signal. Than, the SR flipflop 516 maintains a current output state. When the voltage of the signal VCT is reduced to the reference voltage VR6, the signal U2 becomes a high-level signal and the signal U1 is a low-level signal. Then, the SR flipflop 516 outputs the first oscillator signal U3 in low level through the output end Q, and outputs the second oscillator signal U4 in high level. The switch 518 is turned off by the low-level first oscillator signal, the capacitor 517 is charged by the current Ib1 of the first dependant current source 512, and the voltage of the signal VCT is increased. Since the voltage of the signal VCT is increased to be higher than the reference voltage VR6, the signal U2 becomes a low-level signal. Then, the SR flipflop 516 maintains the current output state until the voltage of the signal VCT reaches the reference voltage VR5.

The oscillator 510 according to the exemplary embodiment of the present invention repeats the above-described operation. When the current Ib is changed in accordance with the output voltage Vout and the current Ids2, currents of the first and second dependant current sources 512 and 513 are changed. Then, the intensity of the current that charges or discharges the capacitor 517 is changed so that an increase/decrease slope of the voltage of the signal VCT is changed.

If a period during which the voltage of the signal VCT is increased to the reference voltage VR5 from the reference voltage VR6 and then decreased to the reference voltage VR6 is set to one period of the signal VCT, the period of the signal VCT is changed in accordance with the output voltage Vout and the current Ids2. Accordingly, periods of the first and second oscillator signals U3 and U4 are changed.

As described, the resonant converter according to the present embodiment changes the switching frequency of the upper-side switch 101 and the switching frequency of the lower-side switch 102, and controls the switching operation thereof by using signals of which periods vary according to the output voltage Vout and the current Ids2.

The current detection unit 520 sets a turn-off time point of the lower-side switch 102 as a reference time point for determination of the phase of the driving current Ip. The current detection unit 520 detects the current Ids when the lower-side switch 102 is turned off, and changes the intensity of the current Ib according to a detection result.

If the current Ids is lower than a first reference value when the lower-side switch 102 is turned off, a transistor 521 is turned on for increasing the intensity of the current Ib. Then, the charges charged in the capacitor 450 are discharged so that the current im2 is increased, thereby increasing the current Ib. When the current Ib is increased, the switching frequency is increased so that an inductance component of the resonant network is increased. Then, the phase of the driving current Ip lags behind.

If the current Ids is greater than a second reference value when the lower-side switch 102 is turned off, the current detection unit 520 turns off the transistor 521 in order to stop the increase of the switching frequency. At this time, the phase of the driving current Ip significantly lags behind compared to that of the driving voltage Vd. The second reference value is set to be greater than the first reference value for generating a sufficient phase difference between the driving current Ip and the driving voltage Vd, and this is a hysteresis for stable operation of the converter in the inductive region. If the current Ids is smaller than the first reference value when the lower-side switch 102 is turned off and thus the switching frequency is increased, the current Ids is increased to the second reference value that is greater than the first reference value, and then the increase of the switching frequency is stopped. At this time, the phase difference between the driving voltage Vd and the driving current Ip is proportioned to a value that is obtained by dividing time for the driving current Ip to be changed from the second reference value to zero by one period of the driving current Ip.

If the increase of the switching frequency is controlled only by the first reference value, the switching frequency starts to increase again when the current Ids is slightly changed due to the load. Accordingly, a control operation for increasing or stopping the switching frequency may be frequently occurred during the switching operation of the lower-side switch 102. This is not desirable for stable operation control of the resonant converter. Such a frequent change in the switching frequency may result in switching noise. Therefore, it is preferred to set the second reference value to be greater than the first reference voltage for preventing the frequent switching frequency increase operation due to changes in the load.

The current detection unit 520 includes the transistor 521, an SR flipflop 522, a fourth comparator 523, a fifth comparator 527, a sixth comparator 528, a first AND gate 524, a second AND gate 525, and a third AND gate 526. When the lower-side switch 102 is turned off, the current Ids2 is reduced. The current detection unit 520 compares the current Ids with the first and second reference values by using a detection voltage VS1 that is generated when the current Ids2 flows to the resistor 203.

A first threshold voltage VR3 input to a non-inversion terminal (+) of the fifth comparator 527 corresponds to the first reference value, and a second threshold voltage VR4 input to an inversion terminal (−) of the sixth comparator 528 corresponds to the second reference value. The detection voltage VS1 is input to the inversion-terminal (−) of the fifth comparator 527 and the non-inversion terminal (+) of the sixth comparator 528. An output end of the fifth comparator 527 is connected to an input end of the second AND gate 525. An output end of the sixth comparator 528 is connected to an input end of the third AND gate 526.

A reference voltage VR2 is input to an inversion terminal (−) of the fourth comparator 523, the signal VCT is input to a non-inversion terminal (+) of the fourth comparator 523, and an output of the fourth comparator 523 is connected to an input end of the first AND gate 524. When the signal VCT is lower than the reference voltage VR2, a low-level signal is transmitted to the first AND gate 524, and when the signal VCT is greater than the reference voltage VR2, a high-level signal is transmitted to the first AND gate 524. An output end of the first AND gate 524 is connected to the input ends of the second and third AND gates 525 and 526.

The reference voltage VR2 is smaller than the reference voltage VR5 and greater than the reference voltage VR6. The reference voltage VR2 is set for detecting a time point that the lower-side switch 102 is turned off, and is lower than but very close to the reference voltage VR5. That is, when the voltage of the signal VCT reaches the reference voltage VR5, the lower-side switch 102 is turned off so that the current Ids2 cannot be detected. When the reference voltage VR2 is close to the reference voltage VR5, a time point before the turn-off of the lower-side switch 102 can be detected. The reference voltage VR2 may be set to a proper value for detecting the time point before the turn-off of the lower-side switch 102. The reference voltages VR2, VR5, and VR6 may be respectively set to 2.9V, 3V, and 1V according to the exemplary embodiment of the present invention. While the lower-side switch 102 is turned on, an inversion output terminal /Q of the SR flipflop 516 outputs a high-level signal.

Therefore, the first AND gate 524 outputs a first sampling signal SP1 in high level when the voltage of the signal VCT is greater than the reference voltage. Since the first sampling signal SP1 is input to the second and third AND gates 525 and 526, outputs of the second and thirds AND gates 525 and 526 are determined in accordance with signals respectively input to input ends of the second and third AND gates 525 and 526.

That is, when the detection voltage VS1 is smaller than the first threshold voltage VR3, the second AND gate 525 outputs a second sampling signal SP2 in high level. In addition, when the detection voltage VS1 is greater than the second threshold voltage VR4, the third AND gate 526 outputs a third sampling signal SP3 in high level. An output signal of an output end Q of the SR flipflop 522 is determined by the second and third sampling signals SP2 and SP3. An output signal of the SR flipflop 522 is determined by signals input to a set end S and a reset end R, and operation of the SR flipflop 522 is the same as that of the SR flipflop 516.

The protection unit 540 shuts down the converter if a time period during which the detection voltage VS1 becomes lower than the first threshold voltage VR3 is longer than a shutdown delay time. In further detail, the protection unit 540 counts the number of times that the detection voltage VS1 becomes smaller than the first threshold voltage VR3 when the lower-side switch 102 is turned off, and stops the switching operation of the converter when the counted number of times is greater than a predetermined number of times.

In addition, when the detection voltage VS1 becomes greater than the second threshold voltage VR4 during the counting, the protection unit 540 resets the counting result. That is, if the driving current Ip becomes smaller than the first reference value as often as a predetermined number of times when the lower-side switch 102 is turned off, the switching operation is stopped to protect the converter, and the counting result is reset if the driving current Ip becomes greater than the second reference value before the predetermined number of times is counted when the lower-side switch 102 is turned off.

If the number of times that the driving current Ip becomes smaller than the first reference value reaches a predetermined number of times, the converter is determined to have an abnormal operation condition due to its load so that the switching operation is stopped to protect the converter. In further detail, the protection unit 540 includes a counter 541 and an SR flipflop 542. The counter 541 includes a first input end IN1 to which the second sampling signal SP2 is input, a second input end IN2 to which the third sampling signal SP3 is input, and an output end OUT. The counter 541 counts the number of times that the second sampling signal SP2 is input thereto. If the counting result is greater than a predetermined value, the counter 541 outputs a high-level signal through the output end OUT. When the third sampling signal SP is input to the second input end IN2, the counter 541 resets the counting result. The SR flipflop 542 operates the same as the above-described SR flipflop 516.

The SR flipflop 542 determines a level of a protection signal PS according to an output signal of the counter 541. When the high-level signal output from the counter 541 is input to a set end (S), a high-level protection signal PS is output to NOR gates 534 and 535 of a driving unit 530. The NOR gates 534 and 535 respectively input low-level signals to first and second gate drivers 536 and 537. The first and second gate drivers 536 and 537 respectively output gate control signals Vgs1 and Vgs2 for turning off the upper-side and lower-side switches 101 and 102 according to the low-level input signals.

The driving unit 530 includes an inverter 531, two time delay units 532 and 533, two NOR gates 534 and 535, and the first and second gate drivers 536 and 537. The inverter 531 inverts the first oscillator signal U3 and transmits the inverted first oscillator signal to the time delay unit 532 and the NOR gate 534. The time delay unit 532 delays the inverted first oscillator signal /U3 for a predetermined time period, and transmits the delayed signal /U3 to the NOR gate 534. The NOR gate 534 receives the protection signal PS, the inverted first oscillator signal /U3, and the first oscillator signal U3 that has been delayed for a predetermined period of time, generates a first control signal VG1 by performing logical operation on the received signals, and outputs the generated first control signal VG1. The NOR gate 534 outputs a high-level control signal VG1 when the input signals are in a low level. The first gate driver 536 generates a gate control signal Vsg1 for controlling turn-on/off of the upper-side switch 101 according to the control signal VG1, and outputs the gate control signal Vgs1 through a connection terminal 6. The time delay unit 533 delays the first oscillator signal U3 for a predetermined period of time and transmits the delayed first oscillator signal U3 to the NOR gate 535. The NOR gate 535 receives the protection signal PS, the first oscillator signal U3, and the delayed first oscillator signal U3, generates a control signal VG2 by performing a logical operation on the received signals, and outputs the generated control signal VG2. The NOR gate 535 outputs a high-level control signal VG2 when the input signals are in a low level. The second gate driver 537 generates a gate control signal Vgs2 for controlling turn-on/off of the lower-side switch 102 according to the control signal VG2, and outputs the generated gate control signal Vgs2.

A detailed operation will now be described with reference to FIG. 6.

Figure 6:
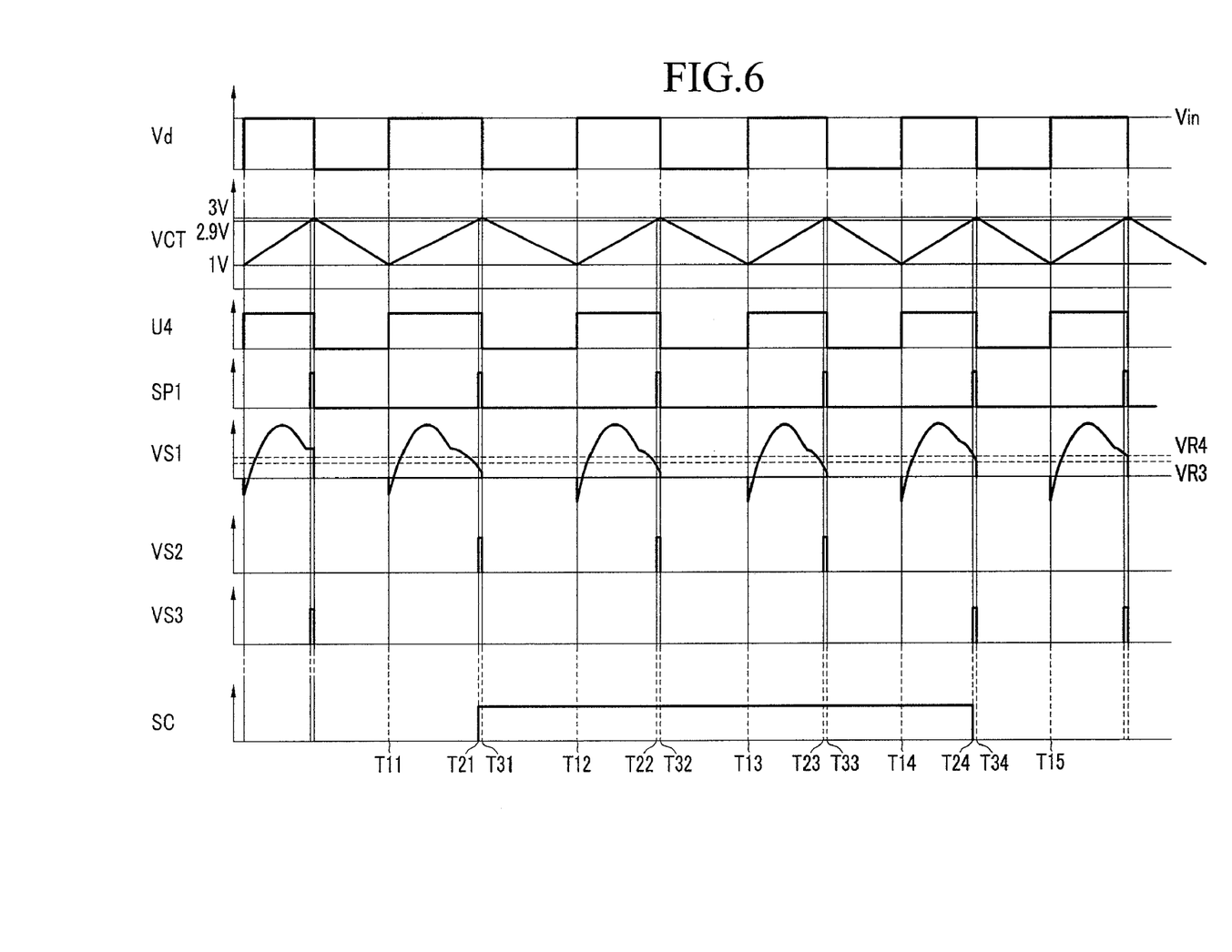
FIG. 6 shows a driving waveform of the resonant converter according to the exemplary embodiment of the present invention.

FIG. 6 shows a driving waveform of the converter according to the exemplary embodiment of the present invention.

As shown in FIG. 6, the switching frequency is decreased as the load is increased. The converter according to the exemplary embodiment of the present invention increases the switching frequency of the converter as the load increases. The load is increased so that the switching frequency is decreased at a time point T11, and a switching frequency from the time point T11 to a time point T12 is more increased than a switching frequency from the time point T12 to a time point T13. This will now be described in further detail.

The converter is not in the overloaded state and operates in the inductive region before the time point T11.

At the time point T11, the load connected to the converter starts to increase. Accordingly, the phase of the driving current Ip becomes close to the phase of the driving voltage Vd.

Therefore, the phase of the detection voltage VS1 that corresponds to the current Ids2 leads the phase at the immediately previous switching operation. At a time point T21, the signal VCT is greater than the reference voltage VR2 and the signal U4 is in a high level, and therefore the first sampling signal SP1 becomes a high-level signal. At the time point T21, the detection voltage VS1 is lower than the first and second threshold voltages VR3 and VR4, and therefore the fifth comparator 527 outputs a high-level signal and the sixth comparator 528 outputs a low-level signal. Then, the second sampling signal SP2 becomes a high level, and the third sampling signal SP3 is maintained in a low level. At a time point T31, the signal U4 becomes a low-level signal so that the first sampling signal SP1 becomes a low-level signal.

Accordingly, the second sampling signal SP2 becomes a low-level signal. That is, a high-level signal SC is output to the set end S of the SR flipflop 522 during the time point T21 and the time point T31 so that the transistor 521 is turned on. The SR flipflop 522 maintains the high-level signal SC until a high-level signal is input to the reset end R thereof. Then, the charges charged in the capacitor 450 are discharged so that a voltage of the node N4 is reduced and a voltage difference of lateral ends of the resistor 440 is increased, and accordingly, the current im2 is increased.

Since the load is increased, the current im1 is decreased so that the current Ib is decreased, but the decreased current Ib can be compensated by the increased current im2. However, as shown in FIG. 6, the switching frequency during the time point T11 and the time point is lower than the switching frequency before the time point T11. That is, a decreased amount of the current Ib cannot be fully compensated by an increased amount of the current im2.

Since the signal SC is maintained in the high level before the high-level signal is input to the reset end R of the SR flipflop 522, the transistor 521 is maintained in the turn-on state. Then, the capacitor 450 is continuously discharged so that the voltage of the node N4 is gradually reduced. Accordingly, the voltage difference of the lateral ends of the resistor 440 is increased so that the current im2 is also increased. The decreased amount of the current Ib is compensated by the current im2 that increases as time passes so that the current Ib may have a larger value than before the time point T11.

After the time point T31, the first sampling signal SP1 becomes the low level, and therefore, the second and third sampling signals SP2 and SP3 becomes low-level signals without regard to a level of output signals of the fifth and sixth comparators 527 and 528.

At a time point T22, the detection voltage VS1 is greater than the first threshold voltage VR3 and is lower than the second threshold voltage VR4. The fifth comparator 527 outputs a low-level signal, and the sixth comparator 528 outputs a low-level signal. Then, the second and third sampling signals SP2 and SP3 are maintained in the low level. At a time point T32, the signal U4 becomes a low-level signal so that the first sampling signal SP1 becomes a low-level signal. Since a high-level signal is not input to the reset end R of the SR flipflop 522, the reset end R of the SR flipflop 522 is maintained with the high-level signal SC. Then, since the voltage of the node N4 is being gradually decreased, the current im2 increases.

At a time point T23, the detection voltage VS1 is greater than the first threshold voltage VR4 and is lower than the second threshold voltage. Since the high-level signal is not input to the reset end R of the SR flipflop 522, the reset end R of the SR flipflop 522 is maintained with the high-level signal SC.

As shown in FIG. 6, the switching frequency becomes faster as the time point changes from T11-T12, to T12-13, and to T13-14.

At a time point T24, the detection voltage VS1 is greater than the first and second threshold voltages VR4 and VR5. Then, the second sampling signal SP2 becomes a high-level signal so that a high-level signal is input to the reset end R of the SR flipflop 522. The signal SC becomes a low-level signal and the transistor 521 is turned off. The current Ib is not further increased by the current im2. Since the high-level third sampling signal SP3 is input to the input end IN2 of the counter 541, the counter 541 resets the number of high-level pulse generation of the second sampling signal SP2 to zero.

As described, the converter according to the exemplary embodiment of the present invention detects the driving current Ip by using the detection voltage VS1 at the time points T21, T22, T23, and T24, which are time points before the turn-off of the lower-side switch 102, and increases the switching frequency when overloaded.

In addition, the protection unit 540 detects the phase of the driving current Ip a predetermined number of times, and shuts down operation of the converter to protect the converter if the phase is not slowed down.

This will be further described with reference to FIG. 7.

Figure 7:
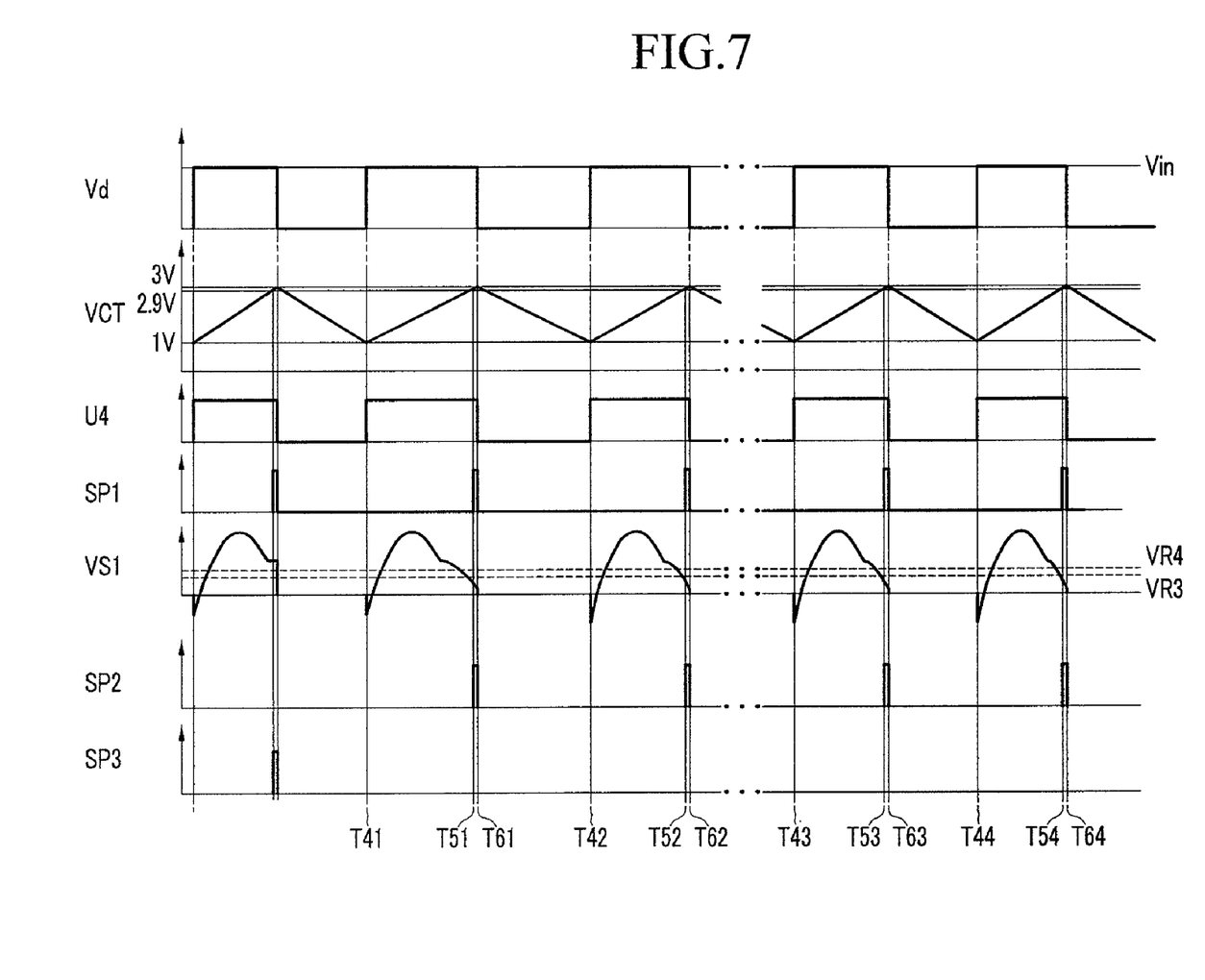
FIG. 7 shows a driving waveform in the case in which operation of the resonant converter according to the exemplary embodiment of the present invention is shut down.

FIG. 7 shows a driving waveform in the case in which the operation of the converter is shut down according to the exemplary embodiment of the present invention. Hereinafter, the basic operation is the same as the operation that has been previously described with reference to FIG. 6. Operation of the protection unit 540 will now be described in further detail.

The load of the converter starts to increase at a time point T41. At a time point T51, the detection voltage VS1 is lower than the first and second threshold voltages VR3 and VR4. Then, the fifth comparator 527 outputs a high-level signal, and the sixth comparator 528 outputs a low-level signal. In this instance, the second sampling signal SP2 becomes a high-level signal, and the third sampling signal SP3 is maintained in a low level. Then, the transistor 521 is turned on so that the current im2 is increased. At a time point T61, the signal U4 becomes a low-level signal so that the first sampling signal SP1 becomes a low-level signal. During time points T51 to T61, a high-level second sampling signal SP2 is input to the counter 541 of the protection unit 540. The counter 541 counts the number of times that the second sampling signal SP2 becomes a high-level pulse.

At time points T52, T53, and T54, the detection voltage VS1 is lower than the first and second threshold voltages VR3 and VR4. If the counting result of the counter 541 equals a threshold value, the counter 541 inputs a high-level signal to the set end S of the SR flipflop 542. Here, the threshold value is set to a proper value during design of the converter. Then, the SR flipflop 542 inputs the high-level signal to the first and second NOR gates 534 and 535. The first and second NOR gates 534 and 535 respectively transmit low-level signals to the first and second gate drivers 536 and 537, and the first and second gate drivers 536 and 537 respectively output low-level gate control signals Vgs1 and Vgs2. Then, the converter does not further perform a switching operation, and is shut down at the time point T54.

Although it has been described that the current Ids2 at the turn-off of the lower-side switch 102 is greater than zero in FIGS. 6 and 7, the phase of the driving current Ip may become faster than that of the driving voltage Vd, and in this case, the current Ids may be smaller than zero. As described, the converter according to the exemplary embodiment of the present invention increases the switching frequency in an overloaded condition so that the phase of the driving current Ip is controlled to be slower than that of the driving voltage Vd with a predetermined phase difference. In addition, if the phase of the driving current Ip is not significantly slower than that of the driving voltage Vd even though the switching frequency is increased, the converter is shut down. If the output end is disconnected, the driving current Ip is increased so that the condition of the converter becomes similar to the overloaded condition. Accordingly, increase of output power of the converter due to the overload or disconnection of the output end can be suppressed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A converter comprising:
   a square wave generator having first and second switches, and configured to generate a square wave signal according to switching operations of the first and second switches;
   a resonant network unit having a first capacitor and a primary coil of a transformer, and configured to resonate a driving voltage by using the first capacitor and the primary coil so as to generate a driving current;
   a rectifier network unit having a secondary coil that is configured to be magnetically coupled to the primary coil of a transformer, and configured to generate output voltage by rectifying a current and a voltage generated in the secondary coil; and
   a switch controller configured to detect the phase of the driving current, and to increase switching frequencies of the first and second switches when a phase difference between the phase of the driving current and that of the driving voltage is smaller than a predetermined value.

2. The converter of claim 1, wherein a current that is the same as the driving current flows to the first switch during a turn-on state, and the switch controller is configured to measure a current flowing through first switch before the first switch is turned off and to detect the phase difference between the phase of the driving current and that of the driving voltage.

3. The converter of claim 2, wherein the switch controller is configured to generate a triangle wave signal having a cycle that is the same as that of the switching frequency of the first switch, turn off the first switch when a voltage of the triangle wave signal reaches a predetermined first reference voltage, and detect the phase of the driving current by detecting the current flowing to the first switch when the voltage of the triangle wave signal reaches a second reference voltage, and the second reference voltage is lower than the first reference voltage.

4. The converter of claim 3, wherein the switch controller is configured to increase a slope of the triangle wave signal when the current measured before the first switch is turned off is smaller than the first reference value, and the first reference value is greater than zero.

5. The converter of claim 4, wherein the switch controller includes a switch that is turned on when the current that is measured before the first switch is turned off is smaller than the first reference value, and the slope of the triangle wave signal is increased in accordance with a current flowing through the turned-on switch.

6. The converter of claim 5, further comprising:
   a capacitor having a first terminal connected to a first terminal of the switch and a second terminal that is grounded; and
   a first resistor having a first terminal connected to the first terminal of the switch and the first terminal of the capacitor and a second terminal that is maintained at a predetermined voltage,
   wherein when the switch is turned on, the capacitor is discharged so that a voltage of the first terminal of the first resistor is reduced.

7. The converter of claim 6, further comprising a second resistor having a first terminal connected to the first switch and a second terminal that is grounded,
   wherein the switch controller comprises:
   a first comparator that is configured to compare a voltage across the second resistor with a first threshold voltage that corresponds to the first reference value;
   a second comparator that is configured to compare the triangle wave signal with the second reference voltage;
   a first logical operator that is configured to generate a first sampling signal corresponding to an output signal of the second comparator;
   a second logical operator that is configured to receive the first sampling signal and generate a second sampling signal corresponding to an output signal of the first comparator; and
   an SR flipflop having a set terminal to which the second sampling signal is input, and an output signal of the SR flipflop controls turn-on/off of the switch.

8. The converter of claim 7, wherein a first threshold voltage is input to a non-inversion terminal of the first comparator, a voltage across the second resistor is input to an inversion terminal of the first comparator, the triangle wave signal is input to a non-inversion terminal of the second comparator, the second reference voltage is input to an inversion terminal of the second comparator, and the first and second logical operators are configured to perform an AND operation.

9. The converter of claim 5, wherein the switch controller is configured to turn off the turned-on switch when the current measured before the first switch is turned off is greater than a second reference value, and the second reference value is greater than the first reference value.

10. The converter of claim 9, further comprising:
    a capacitor having a first terminal connected to a first terminal of the switch, and a second terminal that is grounded; and
    a first resistor having a first terminal connected to the first terminal of the switch, and a second terminal maintained at a predetermined voltage,
    wherein when the switch is turned on, the capacitor is discharged so that a voltage of the first terminal of the first resistor is reduced.

11. The converter of claim 10, further comprising a second resistor having a first terminal connected to the first terminal of the first switch, and a second terminal that is grounded,
    wherein the switch controller comprises:
    a first comparator that is configured to compare voltages across the second resistor with a first threshold voltage that corresponds to the first reference value;
    a second comparator that is configured to compare a voltage across the second resistor with a second threshold voltage that corresponds to the second reference value;
    a third comparator that is configured to compare the triangle wave signal with the second reference voltage;
    a first logical operator that is configured to generate a first sampling signal corresponding to an output signal of the third comparator;

a second logical operator that is configured to receive the first sampling signal and generate a second sampling signal corresponding to an output signal of the first comparator;

a third logical operator that is configured to receive the first sampling signal and generate a third sampling signal corresponding to an output signal of the second comparator; and an SR flipflop having a set terminal to which the second sampling signal is input and a reset terminal to which the third sampling signal is input, and configured to control turn-on/off of the switch by using an output signal thereof.

12. The converter of claim 11, wherein a first threshold voltage is input to a non-inversion terminal of the first comparator, a voltage across the second resistor is input to an inversion terminal of the first comparator, a second threshold voltage is input to a non-inversion terminal of the second comparator, the voltage across the second resistor is input to an inversion terminal of the second comparator, the triangle wave signal is input to a non-inversion terminal of the third comparator, the second reference voltage is input to an inversion terminal of the third comparator, and the first to third logical operators are configured to perform an AND operation.

13. The converter of claim 5, wherein the switch controller further comprises a protection unit that is configured to count the number of times that a current flowing through the first switch before the first switch is turned off is smaller than the first reference value, and allow no more the switching operation of first and second switches when the counted number of times reaches a predetermined number of times.

14. The converter of claim 13, wherein the switch controller is configured to turn off the turned-on switch when the current measured before the first switch is turned off is greater than a second reference value, and the second reference value is greater than the first reference value.

15. The converter of claim 14, wherein the protection unit is configured to reset the counted number of times when the current flowing through the first switch before the first switch is turned off is greater than the second reference value before the counted number of times reaches the predetermined number of times.

16. The converter of claim 1, wherein the first capacitor and the primary coil are connected in series, a voltage signal across the serially connected first capacitor and the primary coil is the driving voltage, and a current flowing to the first capacitor and the primary coil is the driving current.

17. A driving method of a converter, comprising:
generating a driving voltage according to switching operations of first and second switches;
generating a driving current according to a resonance generated in a capacitor and a primary coil that are serially connected between terminals of the first and second switches;
detecting the driving current before the first switch is turned off;
comparing the detected current with a first reference value that is greater than zero, and increasing switching frequencies of the first and second switches when the detected current is smaller than the first reference value; and
stopping the increase of the switching frequencies of the first and second switches when the detected current is greater than a second reference value that is greater than the first reference value.

18. The driving method of claim 17, wherein the increasing of the switching frequency of each of the first and second switches comprises:
generating a triangle wave having a cycle that is the same as that of a switching operation of each of the first and second switches;
increasing a slope of the triangle wave of the detected driving current is smaller than the first reference value; and
turning off the first switch when the triangle wave reaches the maximum value.

19. The driving method of claim 18, wherein the generating of the triangle wave comprises:
charging a first capacitor according with a first current source; and
discharging the first capacitor with a second current source, wherein the triangle wave is a voltage signal of the capacitor.

20. The driving method of claim 19, wherein the increasing of the slope of the triangle wave comprises discharging charges charged in a second capacitor having a first terminal and a second terminal that is grounded, the first terminal connected to a second terminal of a resistor having a first terminal to which a predetermined voltage is applied, and the first and second current sources are increased or decreased corresponding to a current flowing to the resistor.

21. The driving method of claim 17, comprising:
counting the number of times that the detected driving current is smaller than the first reference value; and
allowing no more switching operation of the first and second switches when the counted number of times reaches a predetermined number of times.

22. The driving method of claim 21, wherein the counted number of times is reset when the detected driving current is greater than the second reference value before the counted number of times reaches the predetermined number of times.

* * * * *

UNITED STATES PATENT AND TRADEMARK OFFICE
CERTIFICATE OF CORRECTION

PATENT NO. : 8,036,001 B2
APPLICATION NO. : 12/417168
DATED : October 11, 2011
INVENTOR(S) : Choi Page 1 of 1

It is certified that error appears in the above-identified patent and that said Letters Patent is hereby corrected as shown below:

Title page, Item 54 and Column 1, lines 1-3,
"RESONANT CONVERTER WITH VARIABLE FREQUENCY CONTROLLED BY PHASE COMPARISON" should read --CONVERTER AND DRIVING METHOD THEREOF--.

Title page,
Item 73, Assignee: "Fairchild Korea Semiconductor Ltd., Hyungki-Do (KR)" should read
--Fairchild Korea Semiconductor Ltd., Kyungki-Do (KR)--.

Signed and Sealed this
Twenty-fourth Day of April, 2012

David J. Kappos
*Director of the United States Patent and Trademark Office*